United States Patent [19]
Nabkel et al.

[11] Patent Number: 5,999,613
[45] Date of Patent: Dec. 7, 1999

[54] METHOD AND SYSTEM FOR PROCESSING INCOMING CALLS DURING CALLS-IN-PROGRESS

[75] Inventors: Jafar S. Nabkel; Adam N. Marx, both of Boulder, Colo.

[73] Assignees: U. S. West, Inc., Denver; MediaOne Group, Inc., Englewood, both of Colo.

[21] Appl. No.: 08/937,576

[22] Filed: Sep. 25, 1997

[51] Int. Cl.[6] ........................................... H04M 1/64
[52] U.S. Cl. .................... 379/215; 379/88.26; 379/142
[58] Field of Search ................... 379/215, 67.1, 379/88.23, 88.24, 88.25, 88.26, 142

[56] References Cited

U.S. PATENT DOCUMENTS

| | | | |
|---|---|---|---|
| 5,636,269 | 6/1997 | Eisdorfer | 379/215 |
| 5,706,336 | 1/1998 | Kikinis | 379/93.01 |
| 5,784,448 | 7/1998 | Yaker | 379/215 |
| 5,825,867 | 10/1998 | Epler et al. | 379/215 |

*Primary Examiner*—Fan S. Tsang
*Attorney, Agent, or Firm*—Brooks & Kushman

[57] ABSTRACT

A method and system for processing an incoming call during a call-in-progress utilizes a communication station for detecting the incoming call from a new caller to a subscriber telephony device. The communication station determines whether the subscriber telephony device is busy on a call with a first telephony device. An adjunct processor then determines interruption information about the first telephony device which identifies whether or not the call-in-progress with the first telephony device can be interrupted. The adjunct processor then generates a corresponding signal for receipt by the communication station based on whether or not the call-in-progress with the first telephony device can be interrupted by the new caller.

44 Claims, 3 Drawing Sheets

METHOD AND SYSTEM FOR PROCESSING INCOMING CALLS DURING CALLS-IN-PROGRESS

CROSS-REFERENCE TO RELATED APPLICATIONS

This invention is related to co-pending applications entitled "Method And System For Posting Messages to Callers Based on Caller Identity", having Ser. No. 08/937,577, and "Method And System For Generating Predetermined Messages During Selected Calls-In-Progress", having Ser. No. 08/937,578, both of which are assigned to the assignee and have the same filing date as the present application.

TECHNICAL FIELD

This invention relates to methods and systems for processing incoming calls during calls-in-progress.

BACKGROUND ART

Interrupting calls-in-progress utilizing call waiting features are well known in the art. Call waiting enables a party busy on another call to learn about an incoming call and gives the called party the opportunity to interrupt the ongoing call to accept the incoming call. While call waiting is a useful feature which enables a called party to discontinue lesser important telephone calls in favor of emergency or important calls, subscribers to a call waiting service may be annoyed by unwanted calls since typical call waiting features signal the called party with only a beep, or tone, to indicate another call is waiting. Furthermore, the original caller or called party may become annoyed when a new caller attempts to interrupt the current call-in-progress.

Intelligent call waiting, as disclosed in U.S. Pat. No. 5,636,269 issued to Eisdorfer, addresses this problem by allowing a caller to determine ahead of time who may interrupt their calls-in-progress. If an authorized caller is trying to reach the subscriber while the subscriber is busy on another call, the subscriber will receive a notification, such as a beep, indicating that an authorized caller is trying to interrupt the current call-in-progress.

However, there may be certain individuals that the subscriber would never want to be interrupted, no matter who is trying to call the subscriber. For these individuals, the only way for the subscriber to suspend call-waiting is to enter a special code, e.g., *70, before making the call. However, if the individual initiates the call to the subscriber, the subscriber has no option of disabling call-waiting.

Thus, there exists a need for allowing a subscriber to prioritize his/her call-waiting features while communicating with predetermined individuals regardless of who initiated the call, i.e. establish a priority call-waiting capability.

DISCLOSURE OF THE INVENTION

It is thus a general object of the present invention to provide a method and system for processing incoming calls during calls-in-progress so as to prohibit it interruption by the incoming caller during predetermined calls-in-progress.

In carrying out the above object and other objects, features, and advantages of the present invention, a method is provided for processing an incoming call during a call-in-progress. The method includes the step of detecting the incoming call from a new caller to a subscriber telephony device. The method also includes the step of determining whether the subscriber telephony device is busy on a call with a first telephony device. Still further, the method includes the step of determining interruption information about the first telephony device when the subscriber telephony device is busy wherein the interruption information identifies whether the original call with the first telephony device can be interrupted. Finally, the method includes the step of generating one of a first and second signal based on the interruption information.

In further carrying out the above object and other objects, features, and advantages of the present invention, a system is also provided for carrying out the steps of the above described method. The system includes a communication station for detecting the incoming call from a new caller to a subscriber telephony device and determining whether the subscriber telephony device is busy on a call with a first telephony device. The system also includes an adjunct processor for determining interruption information about the first telephony device when the subscriber telephony device is busy identifying whether the original call with the first telephony device can be interrupted. The adjunct processor also generates one of a first and second signal based on the interruption information.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
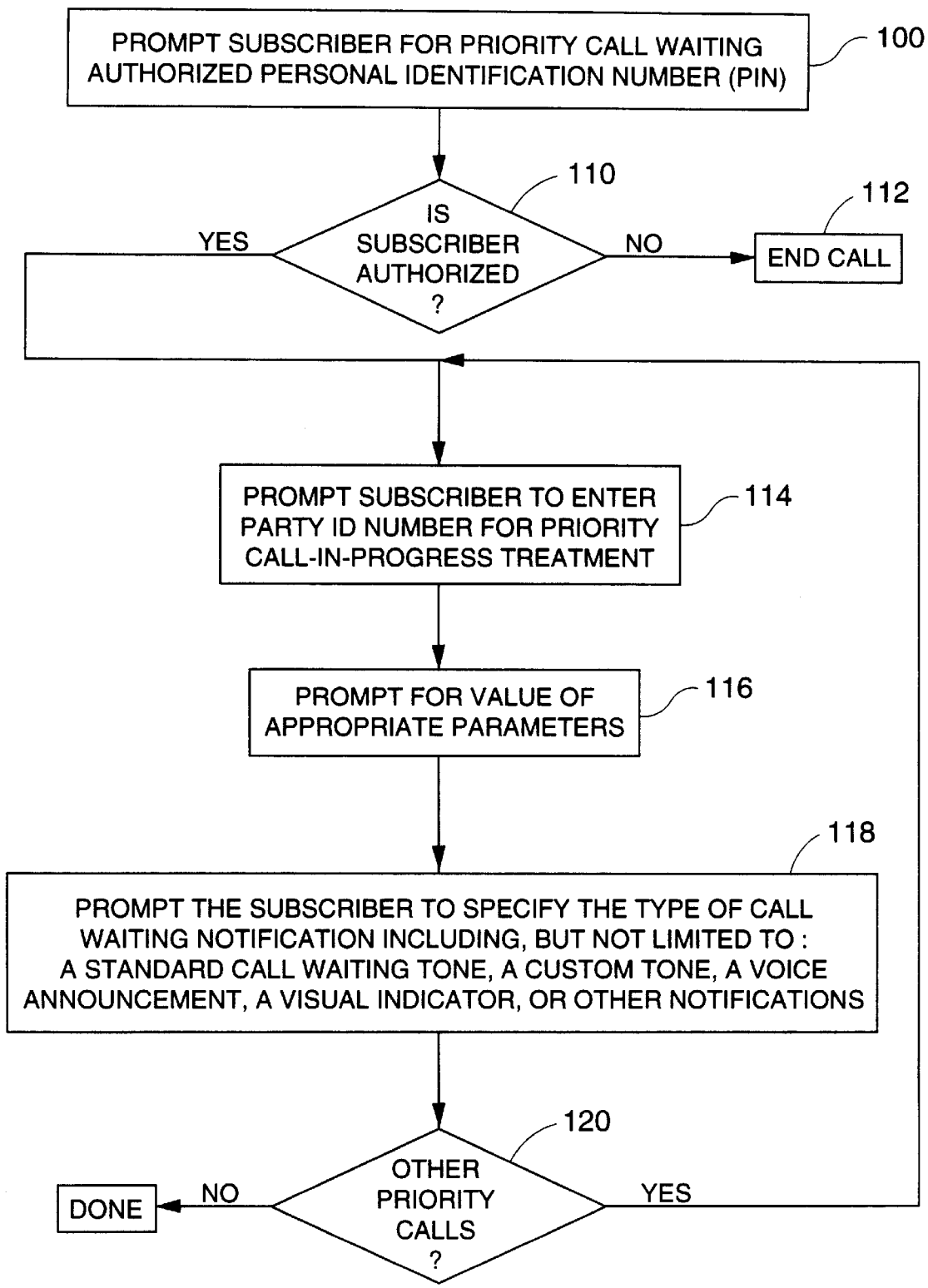
FIG. 1 is a flow diagram illustrating the general sequence of steps associated with configuring the priority call waiting feature of the present invention.

Turning now to FIG. 1, there is shown a flow diagram illustrating the general sequence of steps associated with configuring the priority call waiting feature of the present invention. The subscriber is first prompted to enter his/her personal identification number (PIN), as shown at block 100. If the PIN indicates that the subscriber is not authorized to access the priority call waiting feature, conditional block 110, the call is ended as shown at block 112.

If the subscriber is authorized, the subscriber is then prompted to enter an identification (ID) number, for example, a telephone number, an Internet address/call identifier, or the like, identifying a telephony device having priority call-in-progress treatment, as shown at block 114. A telephony device having priority treatment may be that of a close friend, family member, or even a business partner. The subscriber then enters appropriate parameters for the telephony device, as shown at block 116. These parameters include, but are not limited to, a "never interrupt these calls" indicator, an "always interrupt these calls" indicator, or a "these calls can only be interrupted by specific callers" indicator. In the latter case, the subscriber is then prompted to enter the calling ID numbers of the callers that can interrupt.

The subscriber is then prompted to specify the type of call waiting notification to be provided when interruption is authorized, as shown at block 118. This notification includes, but is not limited to, a standard call waiting tone, a custom tone, a voice announcement, a visual indicator, or other similar notifications.

If there are other telephony devices in which the subscriber would like to indicate priority treatment, the method is repeated, as shown at conditional block 120.

Figure 2:
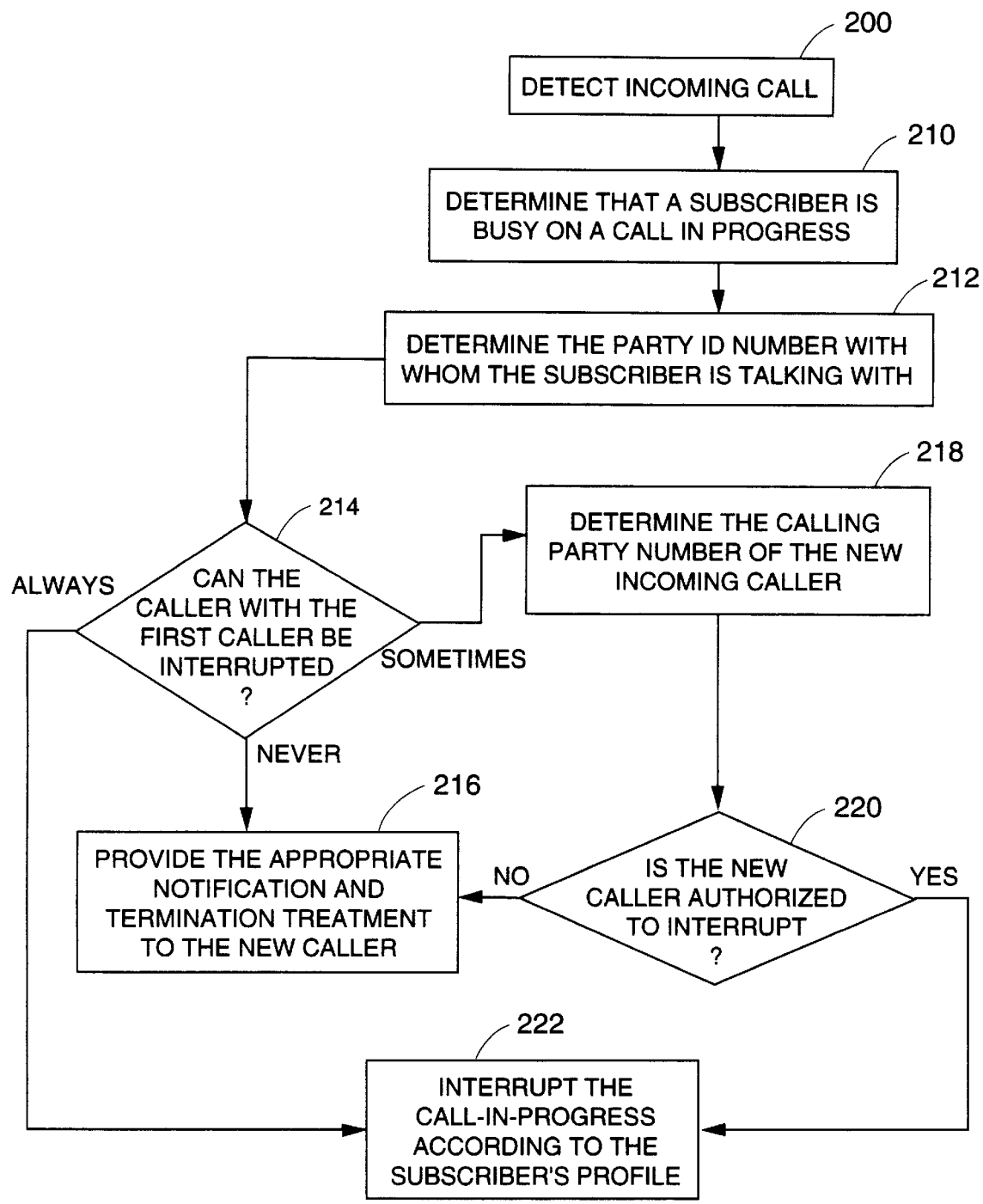
FIG. 2 is a flow diagram illustrating the general sequence of steps associated with the processing of the priority call waiting feature of the present invention.

The operation of the priority call waiting feature of the present invention is illustrated utilizing the flow diagram of FIG. 2. First, the method proceeds to detect an incoming call, as shown at block 200. Upon determining that the called party, or subscriber, is busy on an existing call-in-progress, block 210, the ID number of the first caller with whom the subscriber is talking to is determined, as shown at block 212.

The ID number of the first caller is compared to the ID numbers stored in the subscriber's profile to determine if the call with the first caller can be interrupted at all, as shown at conditional block 214. If the first caller cannot be interrupted, an appropriate notification or treatment is provided to the incoming caller, as shown at block 216. The notification and treatment may include, but is not limited to, a busy tone, a voice announcement, transferring of the call to voice messaging system, or the like.

If the call with the first caller only can be interrupted by specific callers, the ID number of the incoming caller is determined, as shown at block 218. The ID number of the incoming caller may be determined utilizing Automatic Number Identification (ANI) or by prompting the incoming caller to enter his/her calling ID number. The ID number of the calling party then is compared to the ID numbers in the subscriber's profile to determine if the incoming caller is authorized to interrupt, as shown at conditional block 220. If not, the incoming caller is provided with an appropriate notification or treatment, as shown at block 216.

If the incoming caller can interrupt the call-in-progress, the incoming call is processed according to the subscriber's profile, as shown at block 222. The subscriber's profile may include notifying the incoming caller and giving him/her one of several options in proceeding with the call. The incoming caller may be able to just transfer to voice messaging, to proceed with the call, or to indicate importance of the call by either continuing to stay on the line or to hang up and call back later. When the incoming caller wishes to proceed with the call, the subscriber is then given appropriate notification such as, for example, a generic call waiting tone, a custom tone, a voice announcement, a visual indicator, or other similar indicator.

Returning to block 214, if the call with the first caller can always be interrupted, the incoming call is automatically processed according to the subscriber's profile, as shown at block 222. Again, the new caller may have one of several options as discussed above.

The present invention may be implemented utilizing an intelligent network (IN) or an Advanced Intelligent Network (AIN). Alternatively, the present invention may be implemented on or adjunct to a communication station such as, for example, a public switch network end office switch, or a Customer Premise Equipment (CPE).

In the preferred embodiment, utilizing AIN, an IN superimposes on an existing telecommunications system a modular configuration of network elements which provide enhanced telecommunications services. Switching functions are performed by the base network in a conventional manner. The IN includes a communication station such as, for example, a service switching point (SSP), an adjunct processor such as, for example, a service control point (SCP).

The IN may also include an intelligent processor (IP) which provides specialized functionality, such as speech recognition, voice announcements, and speech synthesis capability. The functionality of the IP may be implemented in a separate network element, or may be implemented through a multimedia SCP.

The SSP is a switch that operates to recognize service requests, process telephone calls, and request/receive call handling instructions to complete a telephone call. The SSP provides intelligent network "triggering"—detecting a condition which requires the SSP to initiate the IN service by sending a query to the SCP—used by the network to recognize requests. The SSP also formulates and transmits requests to the SCP and processes replies and requests from the SCP. The SSP creates and plays intelligent network announcements formulated by the service provider (e.g., the local exchange or interexchange carrier), and transmits event messages (such as busy or no reply signals) to the SCP.

The SCP is an IN element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters.

Figure 3:
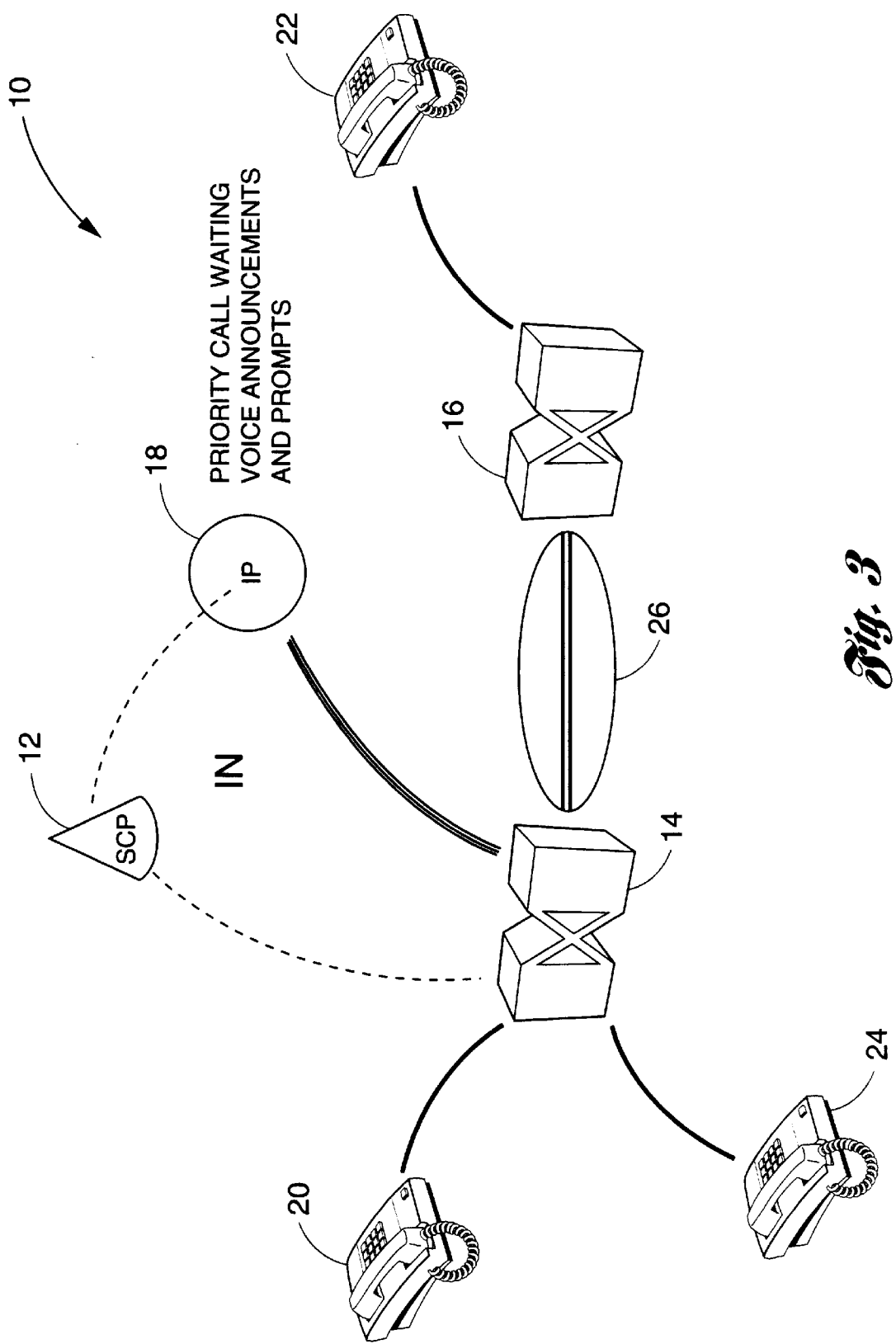
FIG. 3 is a simplified block diagram of a network system architecture suitable for use with the present invention.

An exemplary system architecture suitable for implementing the priority call waiting functionality in accordance with the present invention will now be described with reference to FIG. 3. The system, denoted generally by reference numeral 10, includes an adjunct processor 12 in communication with communication station 14 and/or communication station 16. Adjunct processor 12, such as an SCP, is provided in communication with communication stations 14 and 16 via Signaling System No. 7 (SS7) protocol or a similar messaging protocol and system. The system 10 further includes IP 18 in communication with adjunct processor 12 and communication station 14 and/or communication station 16.

As shown, communication station 14 is provided in communication with a subscriber telephony device 20, while communication station 16 is provided in communication with a second telephony device 22. Communication station 14 is also provided in communication with a third telephony device 24. Telephony devices 20, 22, 24 may be telephones, text-based telephones, computer telephones, or the like, and provided in communication with any similar communication station. Any or all of the telephony devices 20, 22, 24 may be in communication with the same communication station or, alternatively, a different communication station via a communication network 26, as shown in FIG. 3. The communication network 26 may be either the Public Switched Telephone Network (PSTN), a data network such as, for example, the Internet, or any other similar communication network.

The operation of the present invention will now be described with reference to FIG. 3. To configure the priority call waiting feature, the subscriber interfaces with the adjunct processor in one of many ways including, but not limited to, Dual Tone Multifrequency (DTMF) signals via a telephone, a computer interface, a customer service representative, or the like.

Assume for purposes of illustration that the subscriber telephony device 20 is busy on a call with a first caller at the second telephony device 22, and that there is an incoming call for telephony device 20 from telephony device 24. The present invention applies whether the subscriber telephony device 20 or the second telephony device 22 initiated the first call. When the call from telephony device 24 is routed to communication station 14, an attempt is made to route the call to telephony device 20. Communication device 14 detects that telephony device 20 is busy on another call, which produces a trigger on the busy condition. That is, the busy condition at telephony device 20 triggers communication station 14 to query adjunct processor 12 for call processing functions.

Adjunct processor 12 receives from communication station 14 the inquiry and call identification information of the subscriber 20, the first caller 22, and the new incoming caller 24. Adjunct processor 12 then accesses a database for call processing instructions in accordance with the priority call waiting service subscribed to by telephony device 20.

Adjunct processor 12 then compares the ID number of the other party 22 of the original call, as obtained from ANI, or according to the digits dialed by telephony device 20, or by some similar mechanism, with the ID numbers stored in the subscriber's profile in the database associated with the adjunct processor 12. If the ID number of the other party 22 indicates that the call-in-progress cannot be interrupted, the adjunct processor 12 then either instructs communication station 14 to generate a busy signal or instructs IP 18 to generate appropriate voice announcements and prompts, as described above.

If the call with the first party 22 can be interrupted, adjunct processor 12 determines whether or not the first party 22 in the original call can be interrupted by all callers or by specific callers. If the first party 22 can be interrupted by all callers, adjunct processor 12 instructs communication station 14 to generate a call waiting signal for receipt by telephony device 20 if the new caller has chosen to continue with the new call.

If, on the other hand, the first caller can only be interrupted by specific callers or at specific times, days of the week, etc., adjunct processor 12 instructs communication station 14 to collect information about the caller such as, for example, the caller's ID number. The caller's ID number may be obtained utilizing ANI if it is available. If not, adjunct processor 12 instructs IP 18 to prompt the caller and gather a response. The voice prompt may be something to the effect, "The number you have dialed, (777) 555-1212, is currently on the line with another caller. Please enter the 10-digit number you are calling from followed by the pound sign, and I will check to see if your call has priority to interrupt." In addition, adjunct processor 12 may instruct communication station 14 to obtain additional information about the caller, such as a personal identification number (PIN).

Once adjunct processor 12 has this information, it can then determine the appropriate call processing. That is, if the ID number is an authorized ID number, the new caller will have the option of interrupting the first call. Otherwise, the call attempted by the new caller is terminated appropriately. If the new caller is authorized, telephony device 20 may be notified automatically of the new call or the new caller may be prompted for information indicating the importance of the incoming call. An announcement may be played to the new caller as follows: "The person you have dialed is currently on the phone with another party and you have been approved to interrupt. Press '1' if your call is important and you wish to interrupt. Press '2' if you want to leave a voice message, or hang up and call back later." Communication station 14 then executes the instructions provided by the adjunct processor 12.

Thus, the present invention allows a subscriber to control which calls-in-progress can be interrupted and which incoming calls can interrupt the specific calls-in-progress. The present invention allows a subscriber to know that a call that does interrupt is important, thereby reducing the annoyance felt by the other party engaged in the original call.

While the best modes for carrying out the invention have been described in detail, those familiar with the art to which this invention relates will recognize various alternative designs and embodiments, such as a communication station (switch-based) or a CPE implementation, for practicing the invention as defined by the following claims.

What is claimed is:

1. A method for processing an incoming call during a call-in-progress, the method comprising:

detecting the incoming call from a new caller to a subscriber telephony device;

determining whether the subscriber telephony device is busy on a call with a first telephony device having an identification number;

determining the identification number of the first telephony device when the subscriber telephony device is busy, for identifying whether or not the call-in-progress with the first telephony device can be interrupted;

generating one of a first and second interruption signal based on the identification number on the first telephony device.

2. The method as recited in claim 1 wherein determining the identification number includes determining an identity of the first telephony device.

3. The method as recited in claim 2 wherein determining the identity includes determining a telephone number of the first telephony device.

4. The method as recited in claim 3 wherein determining the telephone number includes determining an automatic number identifier (ANI).

5. The method as recited in claim 2 wherein determining the identity includes determining an Internet address or call identifier.

6. The method as recited in claim 1 wherein generating the first and second interruption signals includes determining the identity of the new caller.

7. The method as recited in claim 6 wherein determining the identity of the new caller includes determining a telephone number of the new caller.

8. The method as recited in claim 7 wherein determining the telephone number includes determining an automatic number identifier (ANI).

9. The method as recited in claim 7 wherein determining the telephone number includes prompting the new caller to enter a calling identification number.

10. The method as recited in claim 6 wherein determining the identity includes determining an Internet address or call identifier.

11. The method as recited in claim 6 wherein generating includes generating the first interruption signal for receipt by the new caller if the call-in-progress with the first telephony device cannot be interrupted based on the identity of the new caller.

12. The method as recited in claim 11 wherein generating the first interruption signal includes generating a busy signal.

13. The method as recited in claim 11 wherein generating the first interruption signal includes generating a voice announcement.

14. The method as recited in claim 11 wherein generating the first interruption signal includes generating a visual indicator signal.

15. The method as recited in claim 6 wherein generating includes generating the second interruption signal for receipt by the new caller if the call-in-progress with the first telephony device can be interrupted.

16. The method as recited in claim 15 wherein generating the second interruption signal includes generating a ringing signal.

17. The method as recited in claim 15 wherein generating the second interruption signal includes generating a second visual indicator signal.

18. The method as recited in claim 15 wherein generating the second interruption signal includes generating a second voice announcement prompting the new caller to indicate importance of the incoming call.

19. The method as recited in claim 15 further comprising generating a third interruption signal for receipt by the subscriber telephony device.

20. The method as recited in claim 19 wherein the third interruption signal is a call waiting signal.

21. The method as recited in claim 19 wherein the third interruption signal is a third voice announcement.

22. The method as recited in claim 19 wherein the third interruption signal is a third visual indicator signal.

23. A system for processing an incoming call during a call-in-progress, the system comprising:

a communication station for detecting the incoming call from a new caller to a subscriber telephony device and determining whether the subscriber telephony device is busy on a call with a first telephony device having an identification number;

an adjunct processor for determining the identification number of the first telephony device when the subscriber telephony device is busy, the identification number for identifying whether or not the call-in-progress with the first telephony device can be interrupted, and for generating a corresponding processing signal; and the communication station for generating one of a first and second interruption signal based on the processing signal.

24. The system as recited in claim 23 wherein the adjunct processor, in determining the identification number, is further operative to instruct the communication station to determine an identity of the first telephony device.

25. The system as recited in claim 24 wherein the communication station, in determining the identity, is further operative to determine a telephone number of the first telephony device.

26. The system as recited in claim 25 wherein the communication station, in determining the telephone number, is further operative to determine an automatic number identifier (ANI).

27. The system as recited in claim 24 wherein the communication station, in determining the identity, is further operative to determine an Internet address or call identifier.

28. The system as recited in claim 23 wherein the adjunct processor, in generating the processing signal, is further operative to instruct the communication station to determine the identity of the new caller.

29. The system as recited in claim 28 wherein the communication station, in determining the identity of the new caller, is further operative to determine a telephone number of the new caller.

30. The system as recited in claim 29 wherein the communication station, in determining the telephone number, is further operative to determine an automatic number identifier (ANI).

31. The system as recited in claim 29 wherein the adjunct processor, in determining the telephone number, is further operative to prompt the new caller to enter a calling identification number.

32. The system as recited in claim 28 wherein the communication station, in determining the identity, is further operative to determine an Internet address or call identifier.

33. The system as recited in claim 28 wherein the communication station, in generating one of the first and second interruption signals, is further operative to generate the first interruption signal for receipt by the new caller if the call-in-progress with the first telephony device cannot be interrupted based on the identity of the new caller.

34. The system as recited in claim 33 wherein the first interruption signal is a busy signal.

35. The system as recited in claim 33 wherein the first interruption signal is a voice announcement.

36. The system as recited in claim 33 wherein the first interruption signal is a visual indicator signal.

37. The method as recited in claim 28 wherein the communication station, in generating one of the first and second interruption signals, is further operative to generate the second interruption signal for receipt by the new caller if the call-in-progress with the first telephony device can be interrupted.

38. The system as recited in claim 37 wherein the second interruption signal is a ringing signal.

39. The system as recited in claim 37 wherein the second interruption signal is a second visual indicator signal.

40. The system as recited in claim 37 wherein the second interruption signal is a second voice announcement.

41. The system as recited in claim 37 wherein the communication station, in generating the second interruption signal, is further operative to generate a third signal for receipt by the subscriber telephony device.

42. The system as recited in claim 41 wherein the third interruption signal is a call waiting signal.

43. The system as recited in claim 42 wherein the third interruption signal is a third voice announcement.

44. The system as recited in claim 42 wherein the third interruption signal is a third visual indicator signal.

* * * * *